ROBERTS & DAVIS.
Wheel Cultivator.
No. 17,391.
Patented May 26, 1857.
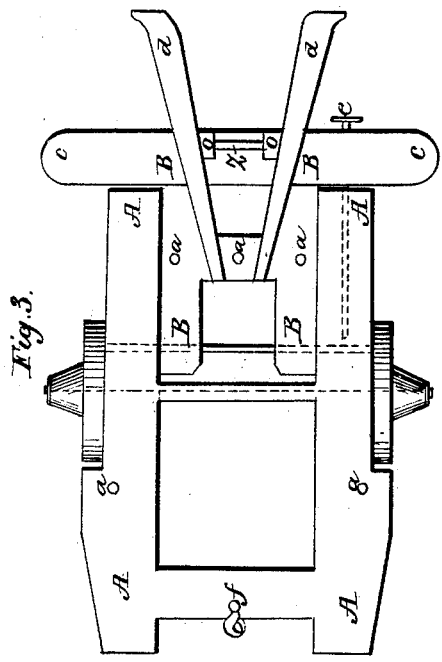
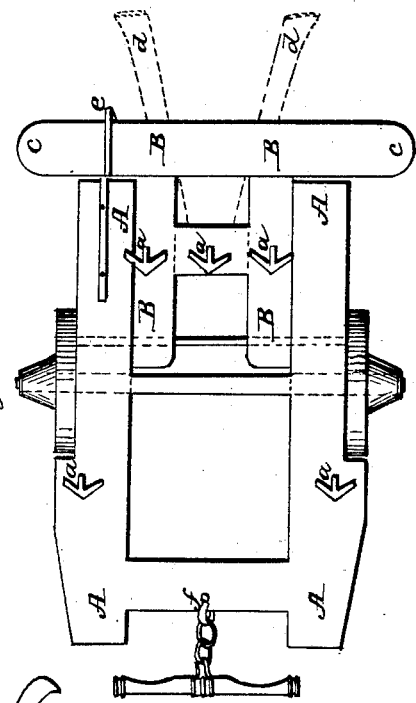
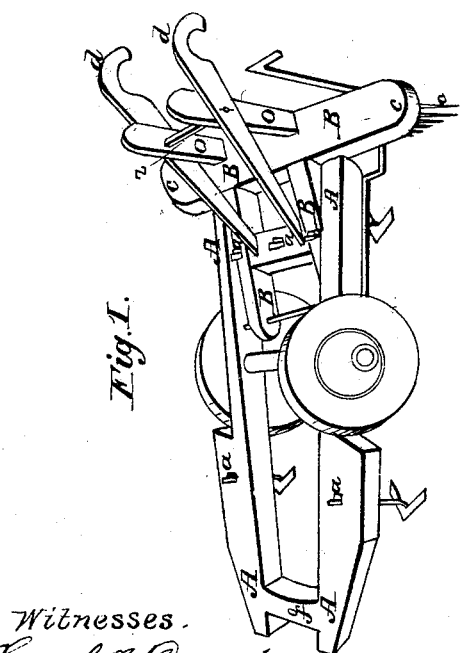
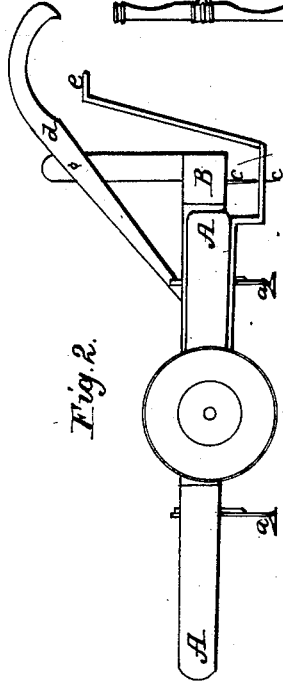
Witnesses.
Inventor.

UNITED STATES PATENT OFFICE.

A. A. ROBERTS AND B. DAVIS, OF LA GRANGE, GEORGIA.

IMPROVEMENT IN COTTON-CULTIVATORS.

Specification forming part of Letters Patent No. 17,391, dated May 26, 1857.

*To all whom it may concern:*

Be it known that we, ALEXANDER A. ROBERTS and BALDWIN DAVIS, both of the city of La Grange, in the county of Troup and State of Georgia, have invented a new and useful Agricultural Implement or Cultivator for Thinning and Working Growing Cotton; and we do hereby declare that the following is a full, clear, and exact description of the construction and operation of the same, reference being had to the annexed drawings, making a part of this specification, in which—

Figure 1 is a perspective view. Fig. 2 is a side view. Fig. 3 is a top view, and Fig. 4 is a bottom view, the parts of same being designated in each view as follows, to wit:

A A A A represent the main frame, B B B B movable frame, $a$ plow-hoe, $c\ c$ harrow, $d$ handle, $e$ brake, and $f$ draft, constructed as follows: first, a frame of the dimensions requisite for use and of the form shown in the drawings, placed on two wheels, with a plow-hoe immediately in front of each wheel; second, a frame to be attached and worked on the outside or inside (the drawings represent the inside) of the first by means of a rod passing through the first frame immediately behind the axle on which the wheels revolve, in which second frame a cross-bar is set, into which are placed plow-hoes $a$ corresponding with those in front of the wheels, (any number desired,) at equal distances, and equidistant on a right line from the hoes in front of the wheels, to which second frame, at a proper distance to give good working room, is attached a harrow or rake with a number of teeth corresponding to the size of the hoes and the space between them, so as to have a sufficient number of rake-teeth to pass over the space cut by the hoes, and at least one rake-tooth to pass over the space left between the hoes, the rake-tooth thus arranged being a little shorter than the teeth following the hoes, and for the purpose of throwing off from the bunches of cotton left standing between the hoes whatever may be thrown upon it by the hoes in working, the whole of the second frame being under the control of two handles, $d\ d$, attached to the cross-bar of the second frame, in which the plow-hoes are set, and extending back to uprights $o\ o$, fixed into the harrow or rake, and fastened by a rod, $z$, to the uprights, and extending back in rear of the rake just so far as is necessary to control and manage the same by hand, the first frame being controlled by a brake, $e$, which is attached to it, and extends under the harrow or rake, and turns upward at a right angle parallel to the handles, and convenient to be managed by hand either on the right or left, the whole being arranged to cut or not cut at the will of the operator, to be used as follows, to wit: with a team attached at the draft $f$, and a hand to manage the handles and brake to cross the rows of cotton at right angles (or any other angle desired) when used for thinning the growing cotton, and otherwise in accordance with its adaptations for agricultural purposes.

What we claim as our invention, and desire to secure by Letters Patent, is—

In combination with the frame A A A A and brake $e$, as described, the movable frame B B B B, armed with hoes $a$ and a harrow, $c\ c$, the teeth of said harrow being so arranged as to cultivate between the bunches of cotton and at the same time clear the standing cotton-plants from clods, &c., in the manner set forth.

City of La Grange, Troup county, Georgia.

ALEXANDER A. ROBERTS.
BALDWIN DAVIS.

Witnesses:
NATHAN G. SWANSON,
WILLIAM S. HARDIN.